United States Patent [19]

Beaven

[11] 4,433,392

[45] Feb. 21, 1984

[54] INTERACTIVE DATA RETRIEVAL APPARATUS

[75] Inventor: Paul A. Beaven, Romsey, England

[73] Assignee: International Business Machines Corp., Armonk, N.Y.

[21] Appl. No.: 329,831

[22] Filed: Dec. 11, 1981

[30] Foreign Application Priority Data

Dec. 19, 1980 [EP] European Pat. Off. ........... 80304654

[51] Int. Cl.³ .................... G06F 11/00; G06K 9/00; G11C 7/00
[52] U.S. Cl. .................................. 364/900; 364/200; 382/34; 382/40; 382/57
[58] Field of Search ... 364/200 MS File, 900 MS File; 340/146.2, 146.3 WD; 382/34, 40, 57

[56] References Cited

U.S. PATENT DOCUMENTS

| | | | |
|---|---|---|---|
| 3,435,423 | 3/1969 | Fuller et al. | 364/900 |
| 3,448,436 | 6/1969 | Machol, Jr. | 364/900 |
| 3,456,243 | 7/1969 | Cass | 364/900 |
| 3,465,299 | 9/1969 | Schellenberg | 364/900 |
| 3,735,366 | 5/1973 | Abrams et al. | 364/200 |
| 4,010,445 | 3/1977 | Hoshino | 340/146.3 WD |
| 4,068,301 | 1/1978 | Ishino et al. | 364/200 |
| 4,158,236 | 6/1979 | Levy | 364/900 |
| 4,255,796 | 3/1981 | Gabbe et al. | 364/900 |
| 4,328,561 | 5/1982 | Convis et al. | 340/146.3 WD |

FOREIGN PATENT DOCUMENTS

2358726  7/1977  France ................................ 364/900

OTHER PUBLICATIONS

"Text Retrieval Computers" by Lee A. Hollaar; Computer vol. 12, No. 3, 1979, pp. 40–50.
"Retrieving Information" by V. A. J. Maller; Datamation, Sep. 1980, pp. 164–172.

Primary Examiner—Jerry Smith
Assistant Examiner—William G. Niessen
Attorney, Agent, or Firm—W. S. Robertson

[57] ABSTRACT

An interactive data retrieval apparatus in which a data base store is searched by content using search keys entered by an operator. Dedicated hardware includes a plurality of search modules and apparatus for clocking the byte-wide data stream read from the data store through successive search modules. In each module, the data is compared with an entered search key. When a match is found between the data stream and the search keys, the data record is displayed to the operator. The apparatus can detect near matches to allow for misspellings etc. In one embodiment of the search module, a plurality of comparison cells perform byte-equality operations on search key data stored in a search key register and the data stream. In a second embodiment, an associative store contains the n-character search key, the associative store being addressed by each character in the data stream as it is clocked past its data port. n shift registers are connected to the outputs of the associative store and are shifted in synchronism with the data stream.

4 Claims, 13 Drawing Figures

INTERACTIVE DATA RETRIEVAL APPARATUS

FIELD OF THE INVENTION

The present invention relates to an interactive data retrieval apparatus in which data records within a data store are searched by means of search keys entered by an operator.

BACKGROUND TO THE INVENTION

Most existing data storage systems, for example magnetic discs, drums and tapes, and magnetic bubble, charge coupled devices, and Josephson devices, are addressed using a numerical location address. However where such stores contain text information it may be much more convenient to search by content. The advantages are the avoidance of hashing algorithms and the flexibility of using an arbitrary search key.

In the past, interrogation of large data stores has been controlled by a central processing unit and although it is possible to interrogate the data base with search keys using appropriate computer programs, this has not hitherto been very convenient for the searcher especially if the operator is unable to specify the exact key word. If the data base has to be searched a number of times to find a match to one of a number of slightly varying key words, this can add appreciably to the search time.

Thus suppose that a searcher wished to search a data base for articles relating to colour cathode ray tubes, he would need to specify "color" as well as "colour" to ensure that articles using the spelling "color" were found. This is a rather simple example but it serves to illustrate the problem with somewhat more complex search keys.

These problems of retrieving data are reviewed in the article "Retrieving Information" By V. A. J. Maller in Datamation, September 1980, pages 164 to 172. This article in particular describes the so-called Content Addressable File Store (CAFS) in which indexed files can be interrogated by an associative search unit. British patent Nos. 1,491,707, 1,492,260, 1,497,676, 1,497,677, 1,497,678, and 1,497,679 describe various aspects of the CAFS. Although reference is made in this article and in the patents to fuzzy matching, this refers to matching of data between arithmetic limits rather than to matching of inexact words.

SUMMARY OF THE INVENTION

An object of the present invention is to provide an interactive data retrieval apparatus which employs special purpose circuitry to allow an operator to interrogate a data store using search key words and which allows a predetermined degree of mismatch between the input key words and the data records stored in the data store.

According to the invention, an interactive data retrieval apparatus comprises a data store to store data records, a keyboard to enable an operator to enter search key data and control data, a data processor to control the storage and retrieval of data records in said data store, and search means to compare search key data entered by the operator with data read from said store thereby to locate a data record within said data store, and is characterized in that said search means includes a search store to contain said entered search key data, a data stream buffer through which successive bytes of data records read from said data store are clocked, and comparison logic means to compare the contents of said data stream buffer with the contents of said search store and to indicate when a match has occurred when said search key data are the same as or differ from said data stream by a predetermined amount.

THE DRAWINGS

The invention will now be particular described, by way of example, with reference to the accompanying drawings, in which.

INTRODUCTION—FIG. 1

Figure 1:
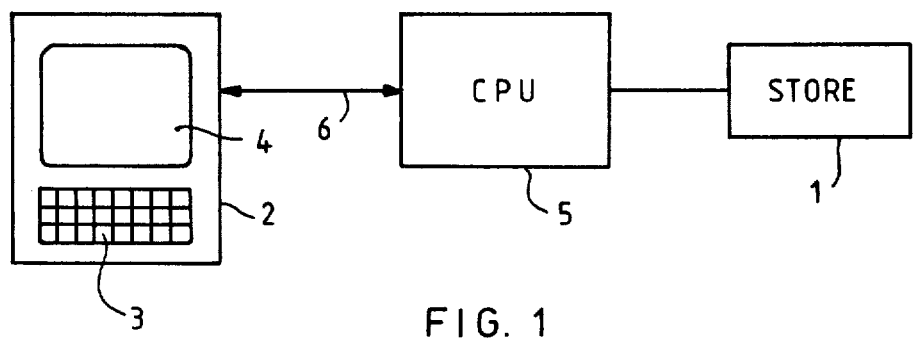
FIG. 1 is a block diagram showing a prior art data base arrangement.

In FIG. 1, data records stored in data store 1 can be accessed by an operator at terminal 2, typically having a keyboard 3 and display 4, under the control of a central processing unit (CPU) 5. Typically the store 1 can be any large capacity store such as a magnetic tape, disc or drum store, or a mass data store such as the IBM 3850 data store. Data records, for example documents, are stored electronically in the store 1 and although typically such a store has an index to the data records stored therein, the object of the present invention is to allow an operator at the terminal 2 to access data records without needing to use the index but to search quickly through the data records themselves.

Communication link 6 allow the operator to send command signals to the CPU 5 and allows the CPU to send commands and/or data to the terminal for possible display on the display 4. A store control unit, not shown in FIG. 1, controls the writing and reading of data into the store 1: those skilled in the art will appreciate that the store control unit may be integrated in the store 1, may be integrated in the CPU 1, or may be constituted by a separate unit connected between the CPU 5 and the store 1.

Typically the terminal 2 may be constituted by an IBM 3101, 3277, 3279 on 8775 display unit. Typically the CPU 5 can be an IBM System 370, 3030 Series or 4300 series processor.

Figure 2:
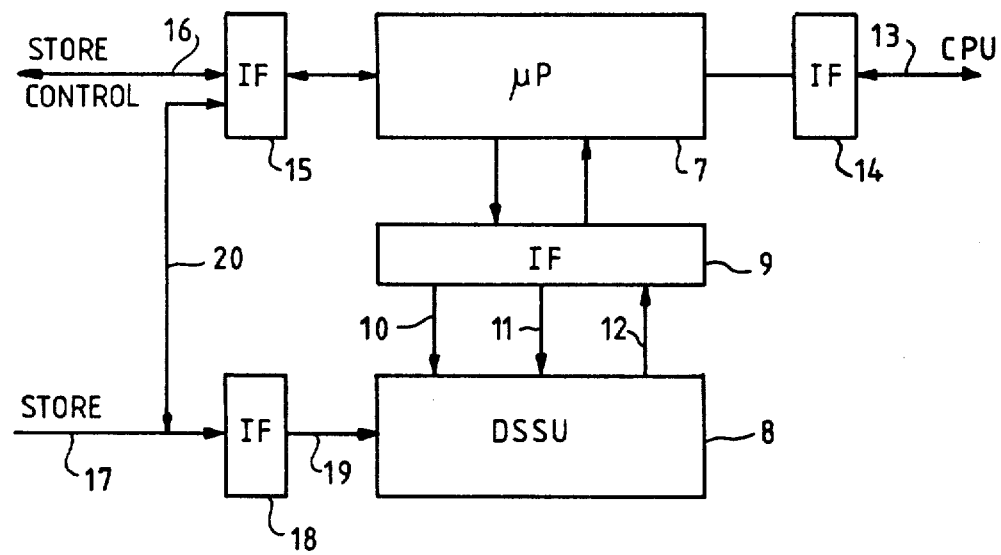
FIG. 2 is a block diagram showing the main components of a search processor which can be connected in the arrangement of FIG. 1 to aid in the searching of data records.

The Text Search Processor (TSP)—FIG. 2

FIG. 2 shows the main elements of a Text Search Processor (TSP) which can be connected between the store to be searched and the central processing unit.

The Text Search Processor includes a microprocessor 7 and a data stream search unit (DSSU) 8 which will be described in more detail below. Interface 9 between microprocessor 7 and DSSU 8 allows search keys and control signals to be loaded into the DSSU 8 from the microprocessor 7 on links 10 and 11 respectively and response signals from the DSSU 8 on link 12 to be loaded into the microprocessor 7. In this embodiment signals to and from the CPU 5, FIG. 1, are transmitted or received on link 13 through interface 14.

Interface 15 allows the microprocessor 7 to communicate with the store control unit on link 16 so that text stored within the store can be supplied to the TSP along link 17 as a byte-wide serial data stream. The data stream received on link 17 is loaded through interface 18 into the DSSU 8 on link 19. Link 20 allows data received from the store on link 17 to be passed through interface 15 to the microprocessor 7 for subsequent display should the DSSU 8 indicate a match between the received data stream and the search key. Link 20 also allows data to be stored in the store under control of the microprocessor 7 and CPU 5, FIG. 1, and allows the microprocessor 7 to keep a record of the address within the store of the data stream currently being clocked through the DSSU 8. It will be apparent that although the TSP has been described as being interposed between the CPU 5 and store 1, FIG. 1, it could also constitute part of the terminal 2, FIG. 1. In this event the interfaces would need to be matched to such an arrangement.

Microprocessors, such as the Motorola 6800, and the need for interfaces are sufficiently well understood by those skilled in the art that no detailed description of these units will be given: they do not, per se form part of the present invention. Before describing the data stream search unit (DSSU) 8 in more detail, the overall operation of the TSP will be described.

When an operator wishes to search the data store by content, he or she enters search keys on the keyboard 3, FIG. 1, together with search parameters including a mutilation of the search key allowed when looking for a match and would account for uncertainty or misspelling.

The search key and the search parameters which are entered by the operator are loaded into the DSSU 8 through interface 9 by the microprocessor 7 and the entered search key is compared with the byte-wide data stream. When a match is found, either an exact match or within the degree of mutilation indicated by the operator, a signal is sent on link 12 to the microprocessor 7. The data record containing the matched text can then be displayed on the screen of the terminal 2, FIG. 1. The data stream received on link 17 can either be divided into two streams, one for searching by the DSSU 8 and the other passing through microprocessor 7 for substantially immediate display after a match or near match has been detected. Alternatively the microprocessor 7 can access the appropriate data record in the store by using the normal store indexing methods to retrieve it.

Figure 3:
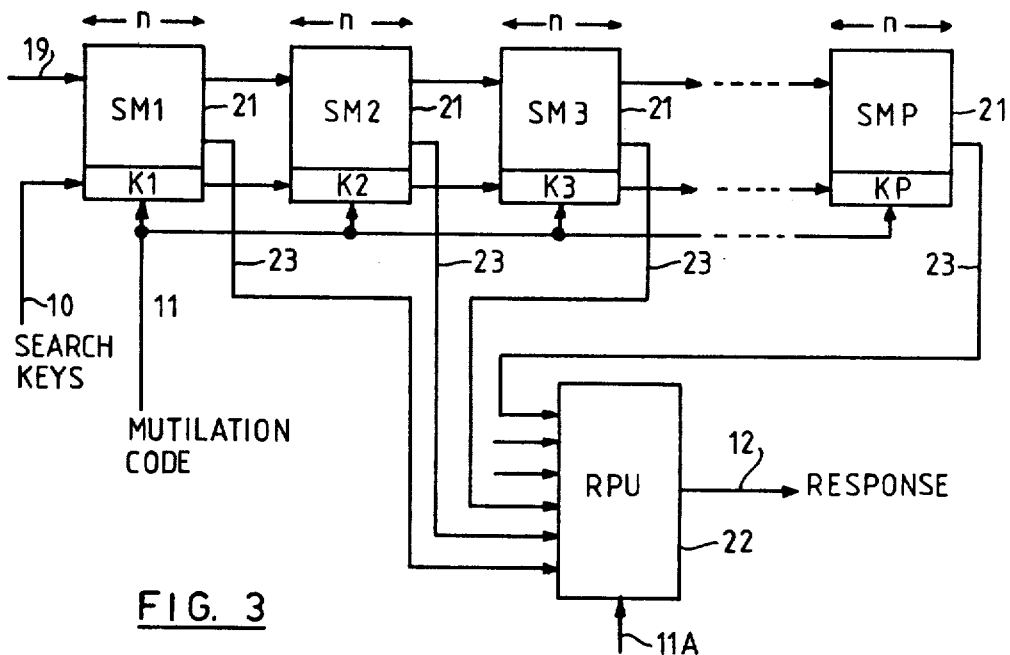
FIG. 3 is a block diagram of a data stream comparator having a modular structure.

The Data Stream Search Unit (DSSU)—FIG. 3

The data stream search unit 8 is shown in FIG. 3 and involves a modular structure so that it can be readily extended in a regular "building-block" fashion. The DSSU consists of p search modules (SM) 21 through which the byte-wide data to be searched on link 19 is clocked serially in turn. Each search module 21 compares the data stored therein with its search key (k), entered on link 10, during each data stream clock pulse. The results of each compare operation are processed in a response processing unit 22 before return to the microprocessor 7, FIG. 2, along link 12. Whether a match is indicated on module output links 23 depends on the data therein, the search key therein, and the degree of mutilation allowed by the mutilation code on link 11. The response processing unit 22 will be described in detail below with respect to FIGS. 12 and 13. If speed is no problem, its function could be performed by the microprocessor 7, FIG. 2.

The total search key can be up to $n \times p$ characters long or up to p separate parallel searches can be made of n characters each.

Figure 4:
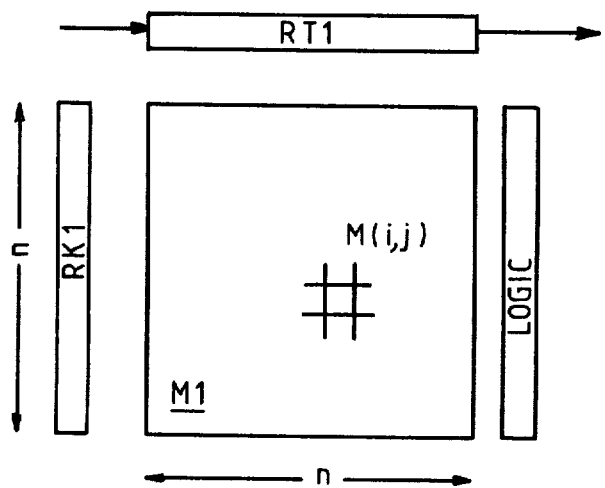
FIG. 4 illustrates a data stream comparator in the form of a matrix.
Figure 5:
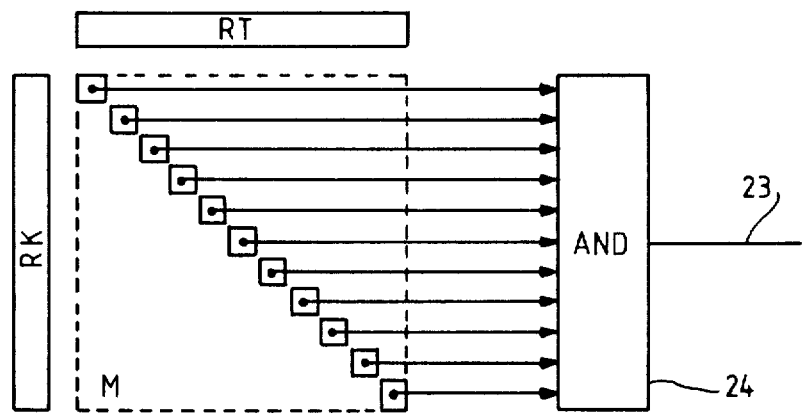
FIG. 5 illustrates the comparator of FIG. 3 connected so as to indicate perfect matching of key words with stored records.
Figure 6:
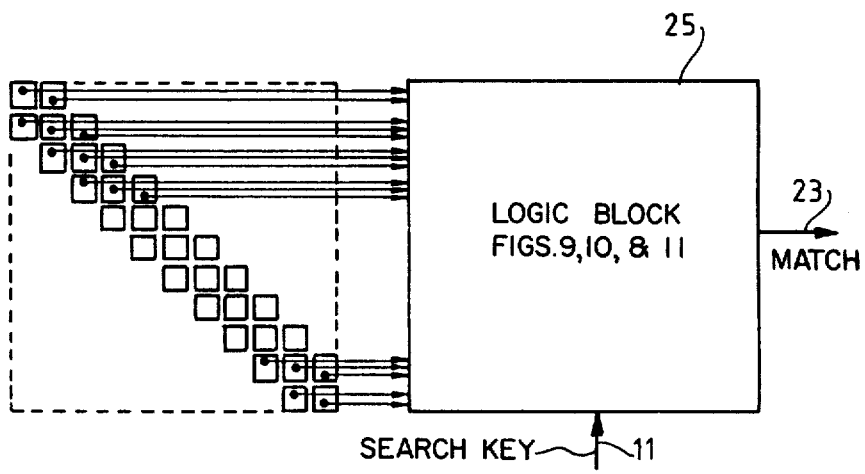
FIG. 6 illustrates the comparator of FIG. 3 connected so as to detect near matching of key words with stored records.

A Search Module—FIGS. 4–6

FIG. 4 diagrammatically shows one implementation of the search modules 21 of FIG. 3. The n-character search keys are stored in the byte-wide registers RK. The data stream being searched is clocked through register RT. Registers RT and RK are connected to a cellular comparator matrix M in such a manner that cell $M(i,j)$ produces a 1 if $RT(i) = RK(j)$. Those skilled in the art will recognize that the equality function for each cell can be performed with a set of inverted Exclusive-OR gates whose outputs feed an AND gate. Given this arrangement, a perfect match between the search key in RK and the data stream in RT will produce a leading diagonal of 1's from the matrix M. Thus a perfect match is detected by logically ANDing all n $m(i,i)$ signals as shown in FIG. 5 by AND gate 24.

It follows that to detect a perfect match only those cells on the leading diagonal need to be utilized. If some of the near-diagonal cells are utilized, approximate matches can be detected so that situations where the key is misspelt or the data in the data stream is mutilated can be detected. FIG. 6 shows how three diagonals of the notional array can be utilized together with logic block 25 for detecting near matches. The logic block 25 will be described in more detail below with respect to FIGS. 9, 10 and 11.

It will be appreciated that for each search module 21 of FIG. 3, some $3n-2$ cells will be needed in practice rather than the full notional matrix.

Figure 7:
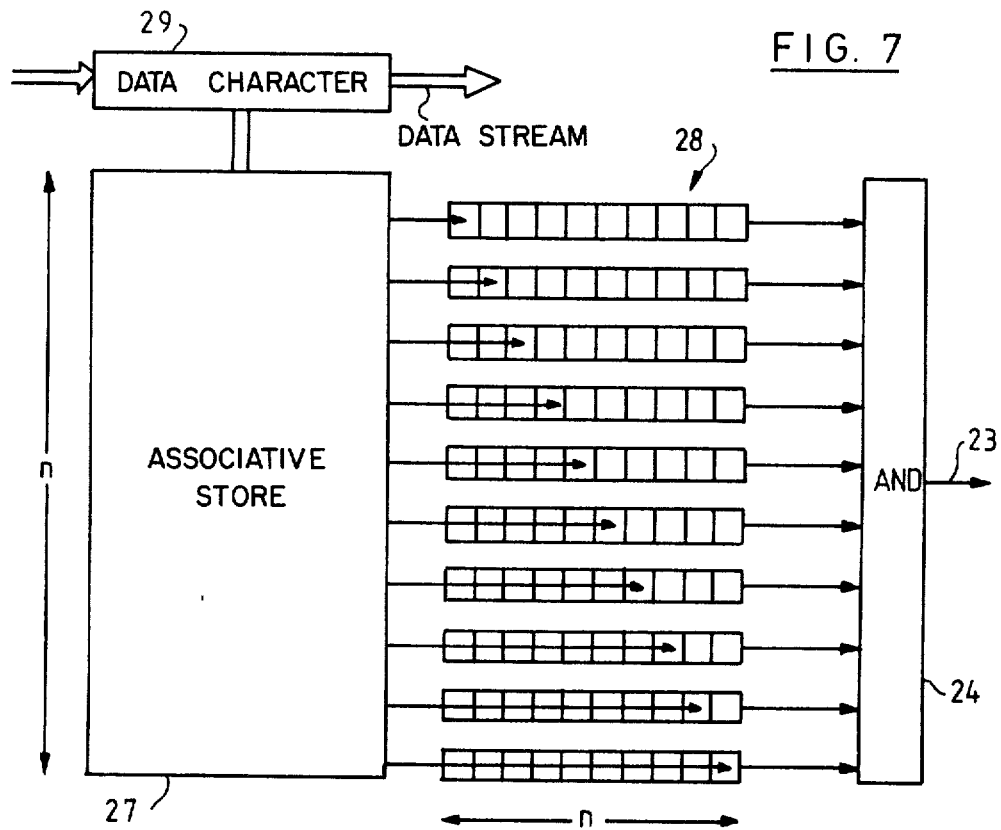
FIG. 7 illustrates an alternative embodiment employing an associative store.
Figure 8:
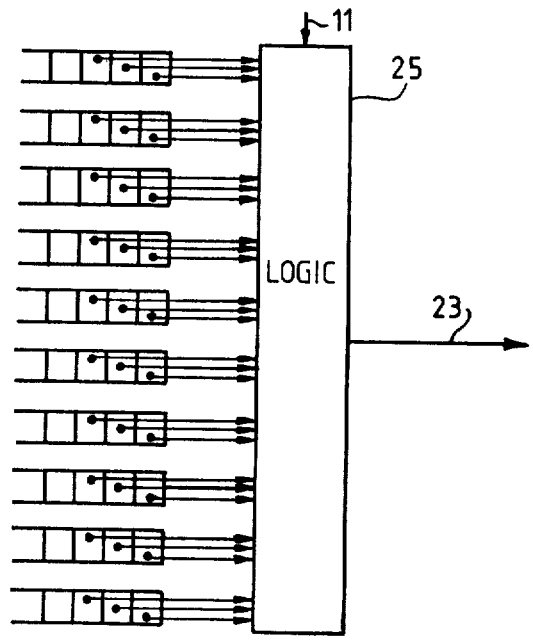
FIG. 8 illustrates how the embodiment of FIG. 7 may be modified to allow near matching.

An Associative Search Module—FIGS. 7–8

FIG. 7 shows an alternative embodiment of the invention in which each search module 21 of FIG. 3 includes an n-byte associative store 27 connected to a set of n-shift registers 28. The byte-wide data stream is clocked a character at a time through a register 29 connected to the data port of the associative store 27. At each clock period of the data stream, the associative store 27 compares the stored characters of the search key with the character applied to its data port. If a character of the associative store detects a match it feeds a 1 to its corresponding shift register 28. By staggering the shift register input connections as shown and clocking the shift registers 28 at the same rate as the data stream being searched, an exact match of the search key in the associative store 27 with the successive characters clocked through the register 29 can be detected by the AND gate 24.

Approximate matching of the data stream with the search key can be detected with the addition of logic 25 as shown in FIG. 8, line 23 providing signals corresponding to exact matching, matching within a first predetermined distance, and matching within a second predetermined distance respectively. As an alternative or additionally, the associative store 27 can be written with "dont't care" characters to extend the latitude of matching obtained using the technique of FIG. 8.

Figure 9:
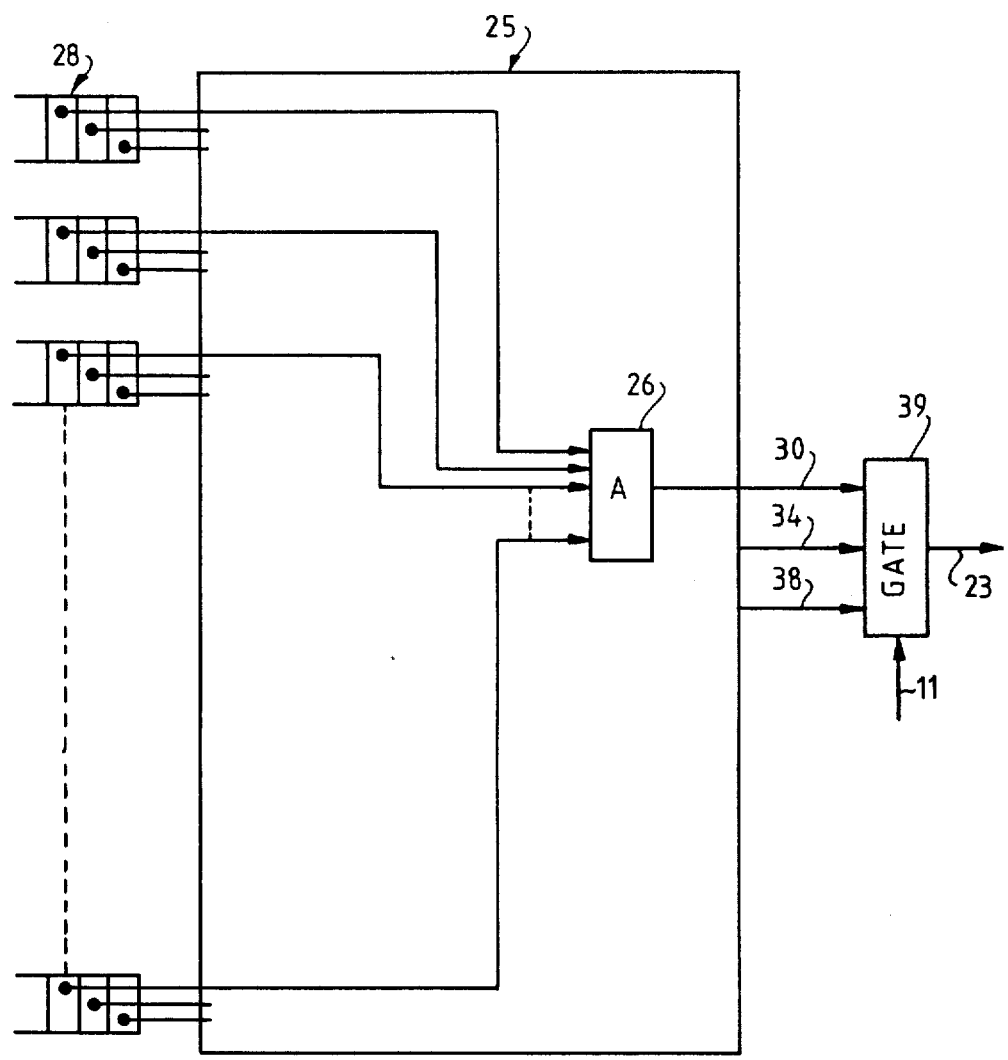
FIGS. 9, 10 and 11 illustrate the logic matching circuits of FIGS. 6 and 8 in more detail.
Figure 10:
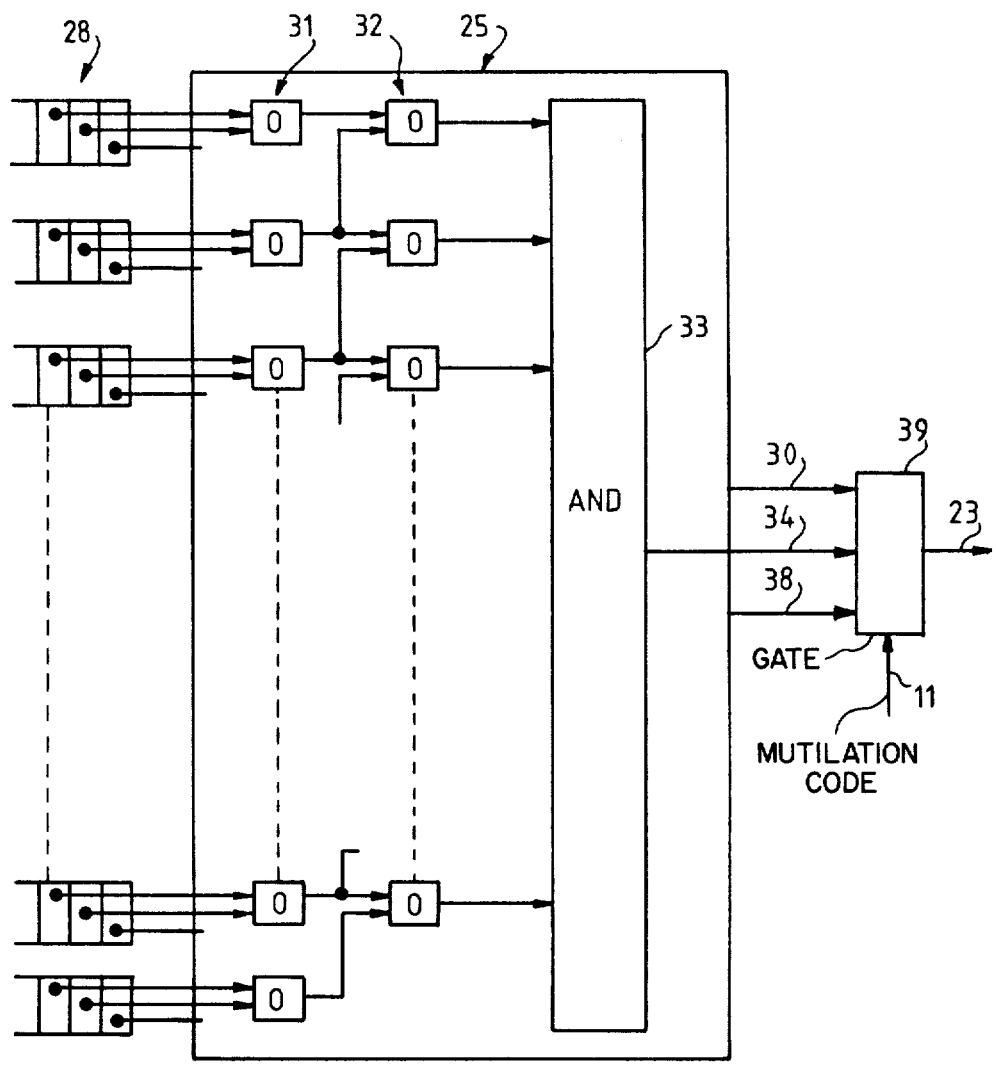
Figure 11:
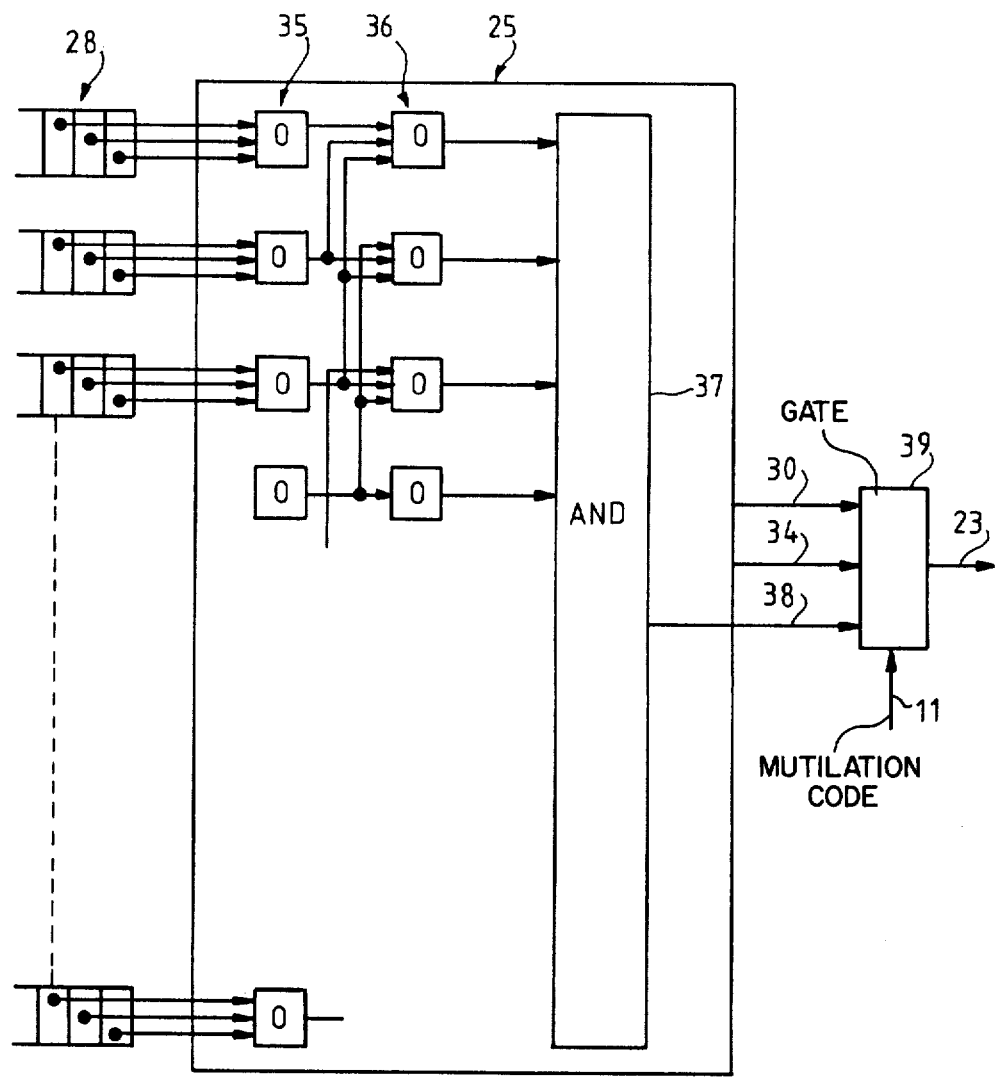

Logic Block 25—FIGS. 9-11

Logic block 25 is shown in detail in FIGS. 9, 10 and 11 and will be described with reference to the embodiment of FIG. 8. It will be appreciated that it is also applicable to the embodiment of FIG. 6. Each of the shift registers 28, FIG. 8 is extended by three stages. A corresponding stage of each shift register 28 is connected as shown in FIG. 9 to an AND gate 26 whose output 30 will be up when there is an exact match between the search key and the data stream.

Two stages of each shift register are also connected, as shown in FIG. 10, to an associated OR gate in a bank of OR gates 31. The outputs of adjacent OR gates 31 are connected through OR gates 32 as shown to an AND gate 33 whose output 34 will be up when the search key matches the data stream within a first predetermined distance. In FIG. 11, all three extra stages of the shift registers 28 are connected as shown to an OR gate 35 of a bank of OR gates. The outputs of each three adjacent OR gates 35 are connected through OR gates 36 as shown to AND gate 37 whose output 38 will be up when the search key matches the data stream within a second predetermined distance.

FIGS. 9, 10 and 11 are shown separately for the sake of simplicity: it will be appreciated that in reality all the different logic gates of FIGS. 9 to 11 will be within one logic block 25. The signals on outputs 30, 34 and 38 are gated through gate 39 to RPU 22, FIG. 3, along links 23 under control of mutilation code signals 11.

Figure 12:
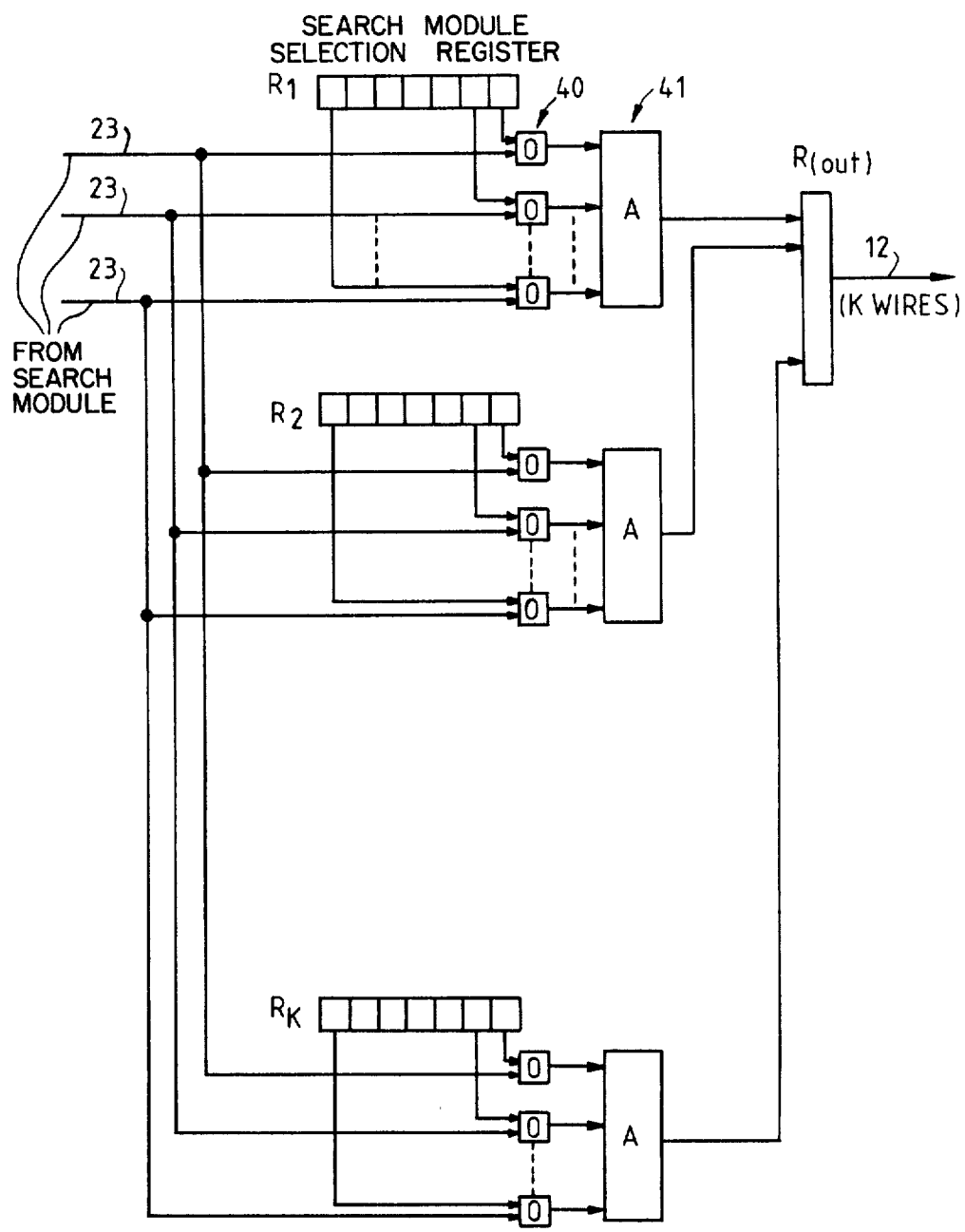
FIGS. 12 and 13 illustrate two versions of the response processing unit of FIG. 3 in more detail.
Figure 13:
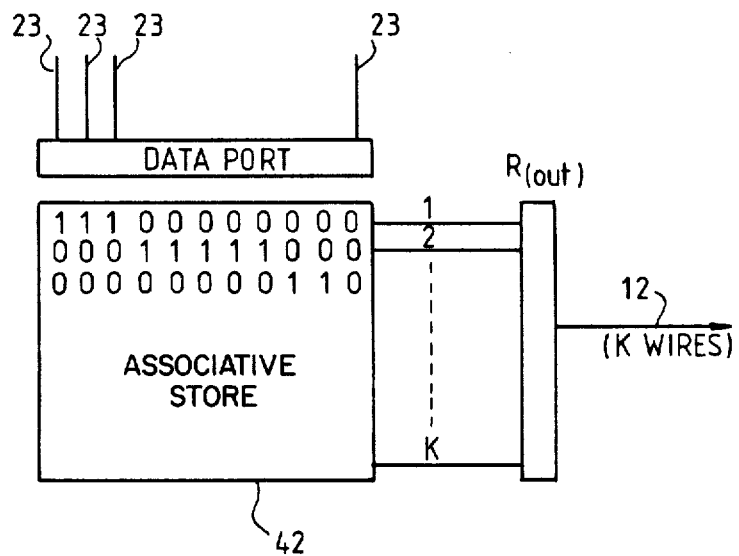

The Response Processing Unit—FIGS. 12-13

FIGS. 12 and 13 show two versions of the response processing unit 22 of FIG. 3 in more detail. The response processing unit functions to collate the responses from the different search modules.

The version shown in FIG. 12 includes a series of registers R1, R2 . . . RK which are written from the processor 7 via link 11A, FIG. 3. Suppose that there are eleven search modules and that three parallel searches are to be performed, the first search needing three search modules, the second search needing five search modules, and the third needing two search modules. Then the registers would be written as follows:
R1=0001111111 (select three search modules)
R2=1110000011 (select five search modules)
R3=1111111100 (select two search modules)
and the unused registers R4 . . . RK can be in any state. Each stage of the registers if OR'ed in its associated OR gate 40 with its associated link 23 from the search module, the output of the OR gates 40 associated with each register being applied to an AND gate 41. The outputs of the AND gates 41 are connected to an output register R(OUT).

The output register R(OUT) is sampled by the processor 7 and its contents are interpreted as:
bit 1=1, the first search has located a match
bit 1=0, the first search has not located a match
bit 2=1, the second search has not located a match
bit 2=0, the second search has not located a match etc.

If required, the contents of R(OUT) could be OR'ed together and used to generate an interrupt to the processor 7 to cause the processor to read R(OUT). Alternatively the processor could sample R(OUT) on a regular basis.

The maximum number of registers is P, the number of search modules in FIG. 3. However K could be chosen to be less than P for reasons of economy. As shown, the response processing unit is a programmable device, that is the partitioning of the search modules is achieved by loading the appropriate bit patterns from the processor into the registers. If the response processing unit is "hardwired" to partition the unit into groups of, say 3, all the registers R1, R2 . . . RK could be eliminated to reduce the cost of the unit.

An Associative Response Processing Unit—FIG. 13

FIG. 13 shows an alternative version of the response processing unit in which the registers R1, R2 . . . RK and OR and AND gates of FIG. 12 are replaced with an associative store 42. The store 42 is written (using location addressing) by the processor 7 with the partition-defining patterns (just as the registers in FIG. 12 except the data is inverted). Thus continuing the previous example, the first 3 search modules form the first search group, the next 5 form the next group, and the following 2 form the remaining group. If the first group detects a match, that is the first three lines 23 are 1, then the first bit in the output register R(OUT) is set, etc.

Further Discussion

High bandwidth operation can be obtained by multiplexing a single data stream between several search modules of the type described above. Since the structure of the circuitry is regular, it is suitable for integrated circuit construction. Since the arrangement of search modules is modular, the system can be readily expanded to allow searching with larger search keys.

The invention is particularly advantageous when used with data bases which are largely unstructured. Thus a telephone directory, in the absence of yellow pages, has very little structure. If it were required to search through such a data base to find a plumber within a particular area, the whole directory may need to be searched.

Modern semiconductor storage devices like charge-coupled devices make it possible to scan a database serially at rates of about 5 megabytes/second. A typical telephone directory is not much more than about 50 megabytes so that the entire data base can be scanned in a time of the order of 10 seconds. As mentioned above, multiplexing would make the search quicker. The ability to obtain inexact matching of the search key with the data stream is a significant advantage.

Highly structured data bases have the advantage that conventional searching can be performed quite quickly. However updating such data bases can be a time consuming, complicated and expensive operation. It is quite possible therefore that increasing use will be made of unstructured data bases in the future.

The use of the microprocessor 7 in the text search processor of FIG. 2 is advantageous in that it gives added flexibility to the apparatus. Thus it could be programmed to allow for additional search parameters such as an occurrence code, a thoroughness code and subsidiary search keys. The occurrence code would indicate the probable number of occurrences of the search key and, for example, could indicate that the key should be unique, or that it could occur an unknown number of times. The thoroughness code would indicate the thoroughness of the search, for example stop on the first occurrence of the search key or stop if the key is not found after a defined period. The subsidiary search keys could be used to define character sequences that are expected within a defined distance of the main search key. The microprocessor can also logically combine the response signals on link 12 to allow for logical combinations of search keys.

Those skilled in the art will recognize other implementations of this invention within the spirit of the invention and the scope of the claims.

Having thus described my invention, what I claim as new, and desire to secure by Letters Patent is:

1. An interactive data retrieval apparatus comprising
  a data store to store data records,
  a keyboard to enable an operator to enter search key data and control data,
  a data processor to control the storage and retrieval of data records in said data store, and
  search means to compare search key data entered by the operator with data read from said store thereby to locate a data record within said data store, the search means including,
  a search store for storing said entered search key data,
  a data stream buffer and means for clocking successive bytes of data records forming a data stream which is read from said data store through said data stream buffer, and
  comparison logic means to compare the contents of said data stream buffer within the contents of said search store and to indicate that a match has occurred
wherein the improvement comprises,
  a plurality of comparison cells in said comparison logic means and means connecting the comparison cells to compare the contents of corresponding positions of said data stream buffer and said search store and to compare the contents of positions of said data stream buffer adjacent said corresponding positions with said corresponding positions of said search store, and
  logic combination means to combine logically the outputs of predetermined groups of said comparison cells to give indictions of an exact match and matching within a predetermined distance
  when said search key data is the same as said data stream or differs from said data stream but only by a predetermined amount.

2. Apparatus as defined in claim 1, wherein said search means includes a plurality of search modules each having a search store in the form of an associative memory,
  a data stream buffer and means connecting said data stream buffer to said associative search store for receiving successive characters in said data stream from said data store, and
  a plurality of shift registers connected to said associative search store to receive the outputs therefrom and
  logic combination means to combine logically the outputs of said shift registers,
  means in said clocking means to clock said data stream through said data stream buffer and said associative store outputs through said shift registers in synchronism.

3. Apparatus as defined in claim 2, wherein said logic combination means includes
  means for logically combining the contents of the last stages of each shift register for detecting a near match of the search keys with the data stream.

4. Apparatus as defined in claims 2 or 3, further comprising means to collate the output of each search module before indicating a match between the entered search key data and a data record in the data stream.

* * * * *